United States Patent [19]
Hall

[11] Patent Number: 4,938,878
[45] Date of Patent: Jul. 3, 1990

[54] IMMISCIBLE SEPARATING DEVICE
[75] Inventor: Wendell Hall, Jeffersonville, Ind.
[73] Assignee: Halltech Inc., Jeffersonville, Id.
[21] Appl. No.: 156,331
[22] Filed: Feb. 16, 1988
[51] Int. Cl.$^5$ ............................................. C02F 1/40
[52] U.S. Cl. ................................... 210/744; 210/801; 210/95; 210/521; 210/532.1; 210/538; 210/540; 210/255; 137/172
[58] Field of Search ................. 210/95, 255, 513, 521, 210/532.1, 533, 537, 538, 539, 540, 744, 800, 801, 803; 137/172, 173, 177, 179

[56] References Cited
U.S. PATENT DOCUMENTS

| | | | |
|---|---|---|---|
| 493,073 | 3/1893 | Darragh | 210/511 |
| 603,587 | 5/1898 | Dorn | 210/511 |
| 745,519 | 12/1903 | Pravicha et al. | 210/513 |
| 1,162,185 | 11/1915 | Nonnenbruch | 210/513 |
| 1,173,725 | 2/1916 | Ludwig et al. | 210/533 |
| 1,544,712 | 7/1925 | Zwicky | 210/513 |
| 2,728,457 | 12/1955 | Clarke | 210/801 |
| 2,767,848 | 10/1956 | Beckett | 210/513 |
| 3,656,912 | 4/1972 | Sugawara | 210/800 |
| 4,022,687 | 5/1977 | Perren | 210/800 |
| 4,035,302 | 7/1977 | Seo et al. | 210/513 |
| 4,038,186 | 7/1977 | Potter et al. | 210/519 |

FOREIGN PATENT DOCUMENTS

| | | |
|---|---|---|
| 70606 | 2/1950 | Denmark . |
| 895190 | 1/1945 | France . |

*Primary Examiner*—W. Gary Jones
*Assistant Examiner*—Christopher Upton
*Attorney, Agent, or Firm*—Edward M. Steutermann

[57] ABSTRACT

Method and apparatus for separating immiscible liquids such as water from oil such as lubricating oil or diesel and fuel oil contained in a reservoir, including an outlet adjacent the lowest part of the reservoir, a first conduit having an inlet connected to the outlet of the reservoir, and a first conduit outlet where a selected segment of the conduit between the conduit inlet and outlet is of reduced diameter, and where a segment of the conduit intermediate the inlet and outlet is offset downwardly, a vertically disposed elongate separator having a midsection of selected diameter with an inlet connected to the outlet of the first conduit, a first receiver having a diameter greater than the diameter of the midsection and having an inlet communicating with the midsection where the first receiver is located above the midsection and a second receiver located beneath the receiver having a diameter greater than the midsection, with an inlet communicating with the midsection where the first receiver includes an end cap, the second receiver includes a bottom cap, an air vent disposed in the first receiver having an inlet located in the upper portion of the first receiver and an outlet disposed outside the first receiver and where the second receiver includes an outlet in the lower portion thereof connected to transparent tube means sight gage. An inverted frustro conical baffle can be located in the second receiver in generally aligned relation with the midsection.

6 Claims, 3 Drawing Sheets

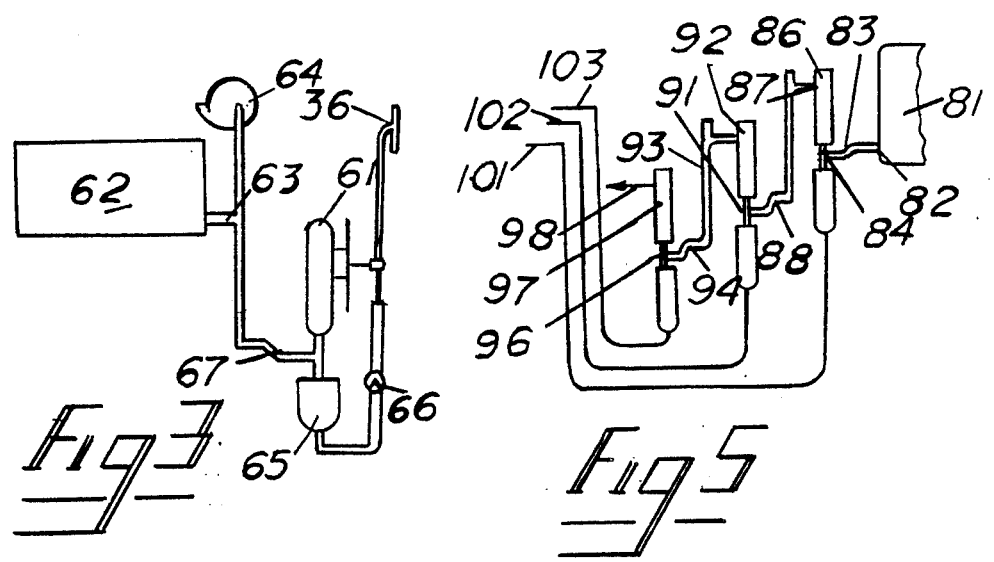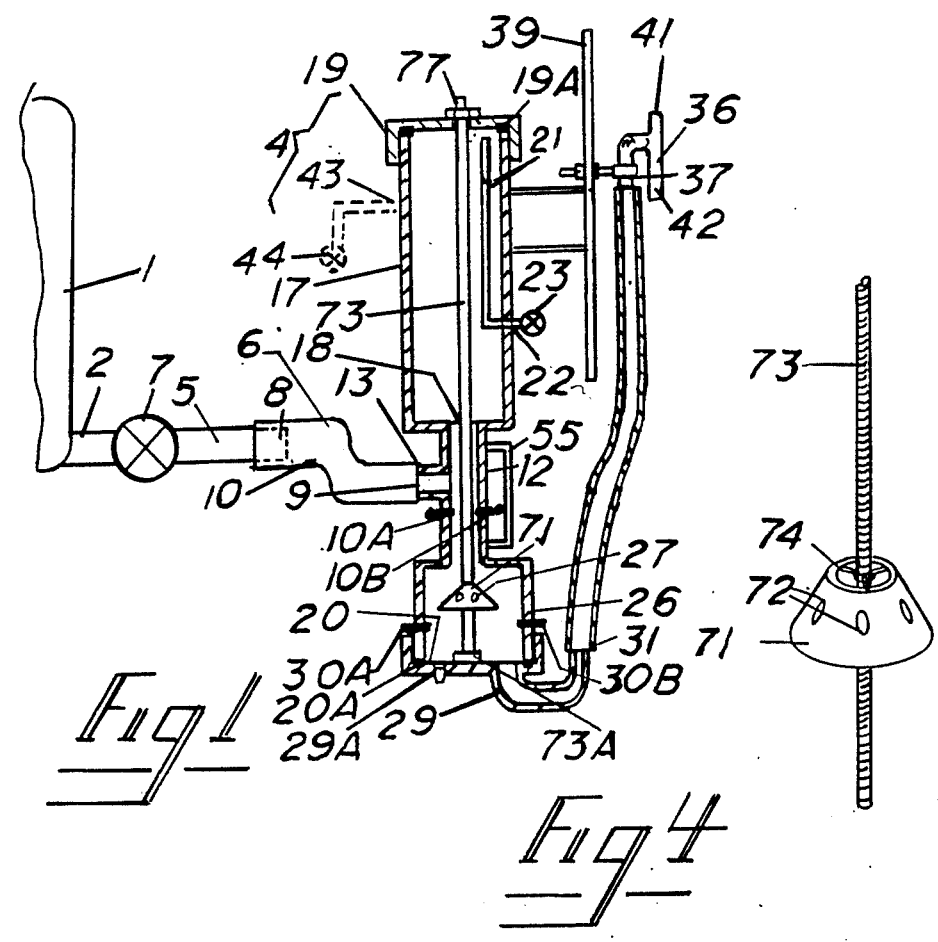

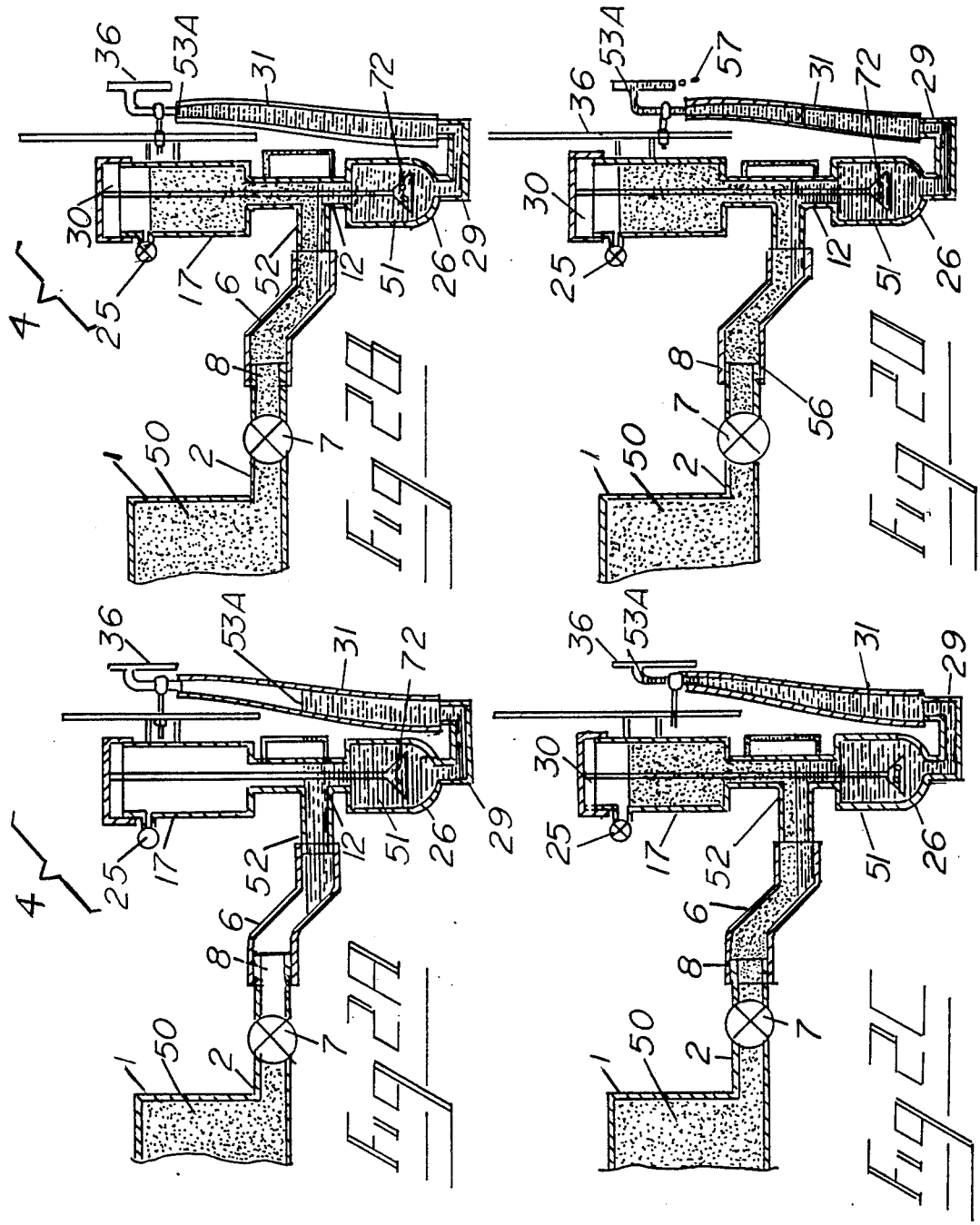

IMMISCIBLE SEPARATING DEVICE

BACKGROUND OF THE INVENTION

The present invention relates to the art of separating immiscible liquids and is particularly useful in the separation of water from oils such as lubricating, diesel or fuel oil while the oil is in use. For example in the case of lubricating oil, the oil can be from the oil pan of a gear box or other power transmission device.

The adverse effect of the presence of water in lubricating oil has been known for some time, however the severity of the damage caused by the presence of water in lubricating oil, particularly where an emulsion is formed, has not been appreciated until recently. Accordingly, in lubricated operating equipment and particularly in power driven transmission equipment, removal of any water from the lubricating oil is necessary to prevent serious damage to expensive moving parts and particularly to bearings. For example, it is now known that as little as 0.2% water in lubricating oil substantially reduces the life expectancy of precision bearings.

The presence of water in fuel or diesel oil can be equally disadvantageous.

In operation of some devices such as motors, oil is conventionally pumped through a filtering device so the oil and water mixture is separated and oil particles contained therein are floated to the top of a separator due to the differences specific gravity between oil and the water. However, the various prior art arrangements have not been adaptable to use in connection with operating equipment, for removal of water from oil because of the size, operating complexity, and expense of prior art devices.

Other prior art arrangements as shown in U.S. Pat. Nos. 4,035,302 4,022,687, and 3,656,912 have been provided for oil/water separation but are, expensive, and cumbersome. The prior art has also included absorption and aggregation type separating devices as shown in U.S. Pat. Nos. 4,038,186 and 4,603,587 to include means which require the use of the mechanical moving means for the oil/water stream and have not been adapted for removal of the water from lubricating oil. Further, devices of the type taught in the prior art generally require frequent attendance by operating personnel.

In another arrangement shown in U.S. Pat. No. 1,544,712, a device is featured for the separation of petrol from water where separation is effected by delivering the fluid to a collector chamber, reversing the direction of motion in the chamber, where a deflector is provided to accomplish dynamic separation of the oil and water.

U.S. Pat. No. 493,073, Darragh teaches an oil filter arrangement providing a valve at the bottom of a casing which receives the oil where a sight glass is provided to gage the amount of water in the bottom of the device. The water is then removed manually on a periodic basis through a valve.

U.S. Pat. No. 2,767,848, Beckett teaches an apparatus for continuous withdrawal of an immiscible liquid phases. A vertical column is provided where the oil water mixture flows into a contacting zone and a packed section is provided where the oil/water mixture flows into a contacting zone and a packed section is provided for separation of the oil and water. Drip legs are provided, one longer than the other, and the inlet of one located in the water phase and the other located in the oil phase to continuously draw oil and water.

U.S. Pat. No. 745,519, Previcha, et. al. teaches a separator where an oil/water mixture is supplied to a chamber with a dual overflow where the water layer overflows one overflow where the water layer overflows one overflow means and the oil overflows through the other overflow means.

U.S. Pat. No. 1,162,185, Nonnenbruch teaches a automatic liquid separator for continuous separation of two immiscible liquids of different specific gravity.

No prior art arrangement is known which provides means for automatic or intermittent separation of water from a oil medium where the device requires no mechanical means for movement of the oil and water mixture in the device for separation.

SUMMARY OF THE INVENTION

The present invention provides a new and useful arrangement particularly for use in separation of immiscible fluids such as water from oil such as lubricating, fuel or diesel oil.

Moreover, devices within the scope of the present invention are economical to fabricate and are highly effective.

Additionally, devices with the scope of the present invention are compact in size so that little area is required for installation of devices and the devices require virtually no attendance to maintain the concentration of water in lubricating oil at extremely low levels.

The present invention provides a method and apparatus for separating immiscible liquids such as water from oil such as lubricating oil or diesel and fuel oil contained in a reservoir, including an outlet adjacent the lowest part of the, reservoir a first conduit having an inlet connected to the outlet of the reservoir, and where a segment of the conduit intermediate the inlet and outlet is offset downwardly, a vertically disposed elongate separator having a midsection of selected diameter with an inlet connected to the outlet of the first conduit, a first receiver having a diameter greater than the diameter of the midsection and having an inlet communicating with the midsection where the first receiver is located above the midsection and a second receiver located beneath the receiver having a diameter greater than the midsection, with an inlet communicating with the midsection where the first receiver includes an end cap, the second receiver includes a bottom cap, an air vent disposed in the first receiver having an inlet located in the upper portion of the first receiver and an outlet disposed outside the first receiver and where the second receiver includes an outlet in the lower portion thereof connected to transparent tube means sight gage. An inverted frustro conical baffle can be located in the second receiver in generally aligned relation with the midsection.

Examples in accordance with the present invention are illustrated in the accompanying drawings but it is to be understood that various other arrangements also within the scope of the present invention will occur to those skilled in the art upon reading of the disclosure set forth hereinafter.

BRIEF DESCRIPTION OF THE DRAWINGS

FIG. 1 is a sectional view illustrating one example in accordance with the present invention;

FIGS. 2A–2C illustrate one mode of operation for a device in accordance with FIG. 1;

FIG. 3 is a schematic illustration of an arrangement with the scope of the present invention;

FIG. 4 is an elevational view of a baffle arrangement of the type shown in FIGS. 2A–2D;

FIG. 5 is a view of cascaded devices of the type shown in FIG. 2A–2D.

DETAILED DESCRIPTION OF THE DRAWINGS

Figure 6:
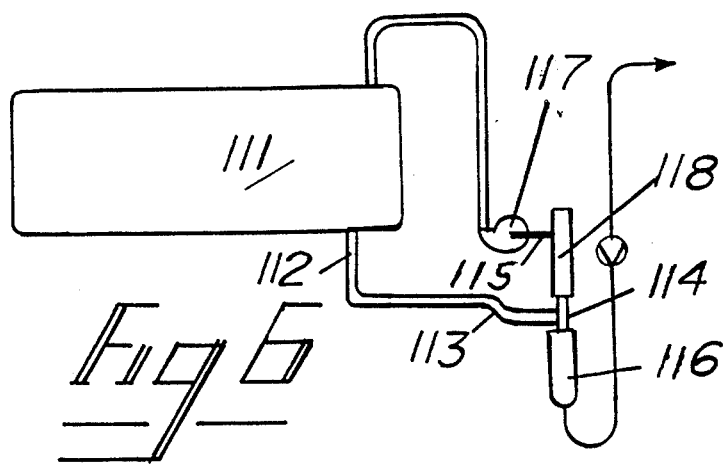
FIG. 6 is a schematic of another arrangement within the scope of the present invention.

FIG. 1 is an illustration of one arrangement within the scope of the present invention and shows a reservoir 1 which for example holds a lubricating fluid for a power transmission device, for example a gear box. An outlet 2 is provided from reservoir 1. A valve 7 can be provided in conduit 2 and has an outlet 5 connected to a conduit 6 connected to a separating device 4 within the scope of the present invention and described hereinafter. Valve 7 is provided from outlet 2 for purposes of isolating the separating device if desired.

Conduit 6 includes an inlet 8, which is connected to communicate with conduit 5 and has a diameter less than the diameter of outlet 9, conduit also has a downward offset 10.

The example of a separating device 4, shown, includes a midsection 12 of selected diameter where an inlet 13 adapted to receive the outlet 9 of conduit 6. The purpose of the midsection is to facilitate separation of the a two phase immiscible mixture contained therein as described hereinafter. Reduced midsection 12 can be of a transparent material, for example glass or heavy plastic to provide visual means to facilitate operation of the device.

An upper receiver 17 is provided having a opening 18 connected to the upper end of midsection 12 and has a diameter greater than the diameter of midsection 12. Container 17 is provided with a cap 19 to close the upper end of the container and an air vent 22 is provided within receiver 17. In the example shown vent 21 is a conduit having an open end adjacent cap 19 and extending through the wall of oil container 17 to a bleed outlet 2 with a valve 23 provided on the end of the inlet to periodically remove entrapped air from container 17. In this regard it will be recognized that vent 22 is useful when the water/oil mixture received at inlet 13 periodically contains mixed air which separates from the mixture and is received in the top of container 17 so that removal of the air is desirable to provide uniform performance of the device. It will be recognized that in devices within the scope of the present invention receiver 17 be open or can be provided without cap 19 when the upper end of receiver 17 is to be located above the level of liquid in reservoir 1.

A lower container 26, also having a diameter greater than the diameter of midsection 12, is provided having an inlet 27 communicating with reduced diameter 12 and includes a bottom 20 including an outlet 29 adapted to receive a conduit 31 for example flexible tubing. Sensors 10A, 10B, and 30A, 30B, can be provided as shown to detect the presence of one of the phases at locations in the device.

FIG. 4 is an illustration of an example of a baffle arrangement useful in separators in accordance with the present invention. A frustro conical baffle 71 is provided which can have holes 72 spaced therein. Baffle 71 can be located in container 26 as shown in FIG. 1 (and container 51, shown in FIGS. 2A–2D and described hereinafter). Baffle 71 is suspended, for example, on a centrally located shaft 73 by means of connectors 74 where shaft 73 can be supported by a tapped boss in bottom 20. The upper end of shaft 73 can be received in a journal 77 in cap 19. The baffle arrangement shown, and equivalent arrangements can be included within the container and located in aligned relation with midsection 12 so that oil globules formed within the baffle and passing through holes 72 rise directly to midsection 12. It is believed that baffles of the type shown in FIG. 4, and equivalent arrangements not shown but within the scope of the present invention, favorably affect the coalescence of oil from the water in receiver 26 and improve the efficiency of removal of oil from the water.

A separator gage 36 can be provided as shown, including an inlet 37 adapted to receive the free end of tube 31. Separator gage 36 is carried by bracket 39 and is adjustable thereon so that the height of separator gage 36 can be adjusted to accommodate various oil levels in reservoir 1. Separator gage 36 includes an open end 41 to prevent siphoning of material from reservoir 1 and further provides an outlet 42 for emission of water as described hereinafter.

In one adaptation in accordance with another feature of the present invention an outlet 43 can be provided from container 17 is shown in dotted line and includes a valve 44 for selective withdrawal of oil from container 17.

The outlet 43 can also be utilized to cascade separator devices as shown in FIG. 5 where such devices can be cascaded when large flow volumes of immiscible fluids are to be processed or where the immiscible fluids are particularly difficult to separate. As also illustrated in FIG. 1 removable end caps 19 and 20 can be provided and held in place by rod 73 to facilitate cleaning since it may from time to time remove solids accumulated in the reservoir.

One mode of operation of an example of a device within the scope of the present invention as shown in FIG. 1 is illustrated schematically in FIGS. 2A–2D. While operation of the illustrative examples in provided is discussed with reference to oil/water mixtures it will be understood that devices within the scope of the present invention operate satisfactorily with any liquid system where a phase boundary occurs and where the specific gravity of one phase is greater than the other.

To facilitate operation of the device a sight glass 55 can be provided to enable the location of the oil/water separation line to facilitate maintenance of the separation line in midsection 12.

It will be noted that the illustrations of FIGS. 2A–2D illustrate an arrangement similar to the one shown in FIG. 1 except that instead of a vent the device merely includes a valve 25 in receiver 17 and tube 21 of FIG. 1 is eliminated. When valve 25 is closed a space 30 is provided in receiver 17 above the oil level to provide a "spring" to level out pressure changes. Also the receiver 26 has a rounded bottom leading to outlet 29.

In operation of the device illustrated in FIG. 2A the separating device 4 is first primed with water 51. The upper level of the water is indicated by the line 52 which indicates that the water partially fills conduit 6 without flowing onto conduit 2 of reservoir 1. Oil 50 is provided from reservoir 1 at the indicated level. The water likewise flows into conduit 31 and the upper level of the water in conduit 31 is indicated by line 53A.

Valve 7 is then opened so that oil flows into the separating device and fills container 17 at least to the upper portion of vent 25 which is open during the filling process. Thus, in the arrangement shown in FIG. 2B the upper level of water 52 forms a boundary layer between the oil and the water and the level in tube 31 is increased as shown by line 53A. Valve 7 is left open during operation of the device so that if any water or water/oil mixtures laying in the bottom of reservoir 1 flow into conduit 6 and midsection 12 of the separating device.

As illustrated in FIG. 2C separator gage 41 is then lowered to the point where water level 53A is immediately adjacent the outlet. It is recognized that the location of the water level 53A is dependent on several factors including the pressure in reservoir 1 as well as the liquid pressure provided by the oil and the relative specific gravities of the water and the oil. Nonetheless, the outlet 36 can be adjusted to accommodate various differences in specific gravity and pressure in reservoir 1 in operation of the device (not shown) associated with reservoir 1.

FIG. 2D illustrates the arrangement where water droplets 56 are present in the oil and are received in water layer 51 so that an equivalent amount of water illustrated by droplets 57 is emitted from the outlet.

It will be recognized that while the arrangement shown in FIGS. 2A-2D accommodates an oil level 50 in reservoir 1 which is approximately equivalent to the height of container 17 devices within the scope of the present invention will accommodate situations as illustrated in FIG. 3 where the oil level in the reservoir may be considerably above the top of separator and it is only necessary to make adjustments in the height of the gage to accommodate such situations. Accordingly, devices within the scope of the present invention can be quite compact and relatively small in comparison with the depth of oil in the reservoir.

Further, FIG. 3 is an illustration of an application of a device within the scope of the present invention where a separator 61 within the scope of the present invention is utilized to separate immiscible fluids from an outlet 63 which also serves as an inlet to a pump 64 utilized to circulate the fluid from the reservoir 62. Startup of the pump would be expected to draw fluid from separator 61. Accordingly, a check valve 66 can be provided in outlet 65 to separator 61.

It will be appreciated that devices within the scope of the present invention, examples of which are illustrated in the drawings, can be utilized for continuous removal of water from an oil containing reservoir or equally satisfactorily for use in connection with the separation of one immiscible fluid from another where the fluid to be separated has a greater specific gravity than the fluid from which it is separated. It is to be further appreciated that devices within the scope of the present invention require minimum attention by an operator or attendant and require no motive force for the fluid to be separated or even return of the lighter separated fluid to the reservoir, while heavier fluids are emitted.

FIG. 5 is a schematic illustration of an example of cascaded devices within the scope of the present invention which would be particularly useful to separate water from, for example fuel oil. In the arrangement shown oil from a reservoir 81 is provided from outlet 82 through an inlet 83 of the type shown in FIG. 1 to the midsection 84 of a first stage separator 86. The oil phase is emitted from outlet 87 through conduit 88 similar to that shown in FIG. 1 to midsection 91 of a second stage 92. The oil phase is emitted from outlet 93 of second stage 92 to a conduit 94 as shown in FIG. 1 to midsection 96 of stage 97 and the oil is finally emitted from outlet 98. Water outlets 101-103 are provided from the stages 86, 92, 97.

FIG. 6 is a view of a recycle system where a liquid which can have two phases is continuously withdrawn from a storage tank 111 and supplied through an outlet 112 to a conduit 113 of the type shown in FIG. 1 to the midsection 114 of separator element within the scope of the present invention where the heavier phase is withdrawn from the bottom 116 and emitted and the lighter phase returned through an outlet 115 of the upper section 118 to a pump 117 for return to the tank. The pump can operate intermittently as needed and may also operate in response to signals generated by electrodes of the type 10A-B or 30A-B shown in FIG. 1.

Figure 7:
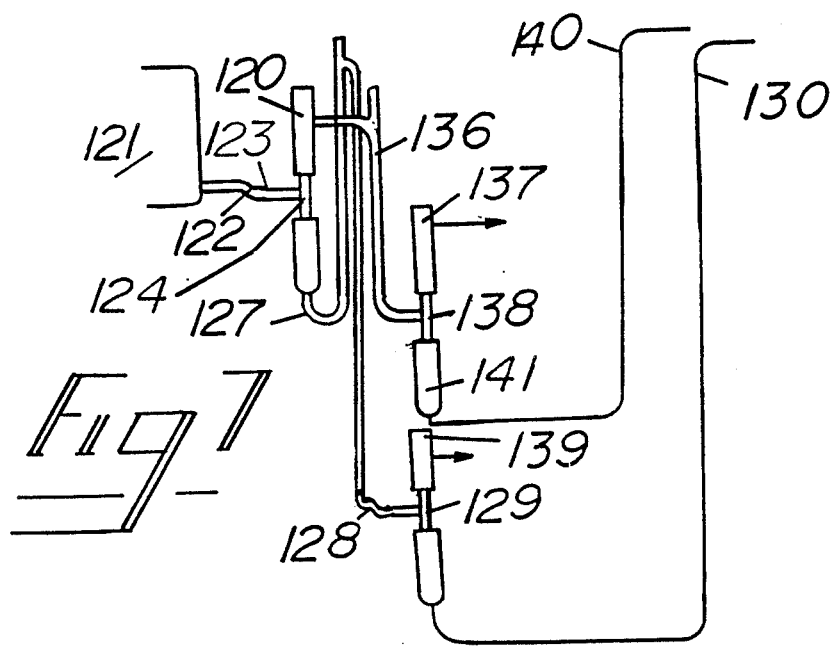
FIG. 7 is a schematic of yet another arrangement within the scope of the present invention.

FIG. 7 is an example of an arrangement where two stage enrichment of both phases is achieved. Material from a tank 121 is supplied through an outlet 122 to separator conduit section 123 of the type described with reference to FIG. 1 to the midsection 124 of separator element. The heavier phase is emitted from the bottom section by means of a conduit 127 through a conduit 128 of the type previously described with reference to FIG. 1 to the midsection 129 of a separator element 139.

The lighter phase is emitted from the separator element 120 through a conduit 136 of the type shown in FIG. 1 to a midsection 138 of a separator element 137 where the enriched lighter phase is emitted from the section 137 and the heavier phase is emitted from the section 141.

Figure 8:
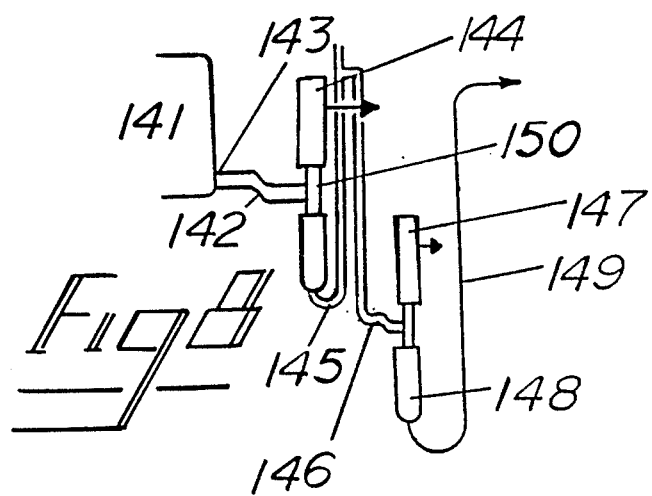
FIG. 8 is another arrangement within the scope of the present invention.

FIG. 8 is an illustration of another arrangement within the scope of the present invention where the heavier phase material from a tank 141 is to be enriched. The liquid is emitted through an outlet 143 through a conduit 142 of the type previously described to the midsection 150 of a separator element 144. The lighter phase is emitter from the separator segment 144 while the heavier phase is emitted from the segment 145 through a conduit 146 of the type within the scope of the present invention to a midsection of a separator element 147 within the scope of the present invention where the finally enriched heavier phase is emitted from the element 148 and the lighter phase removed in the separation is received from the outlet of element 147.

Various other advantages and features of the present invention as well as other arrangements also within the scope of the present invention will occur to those skilled in the art upon reading the disclosure set forth herinbefore.

The invention claimed is:

1. Apparatus for separating first and second immiscible liquids having different specific gravities including a reservoir means to hold said first and second liquids, said reservoir having a reservoir outlet means of selected diameter adjacent a lowest part of the reservoir for emission of mixtures of said first and second liquids, a first conduit having a first conduit inlet of first diameter connected to said reservoir outlet, and a first conduit outlet of second diameter greater than said first diameter, where a segment of said first conduit between said first conduit inlet and said first conduit outlet has a downward offset; vertically disposed elongate separator means having midsection means of selected diameter; midsection inlet means connected to communicate with said first conduit outlet, and midsection first and second openings; first receiver means located above said midsection means having a diameter greater than the diameter of said midsection, first receiver inlet means communicating with said first midsection opening; closure means over the end of said first receiver opposite said first receiver inlet; a second receiver located beneath said midsection means having a diameter greater than said midsection where said second receiver has an inlet means in communication with said second midsection opening and second receiver has a bottom outlet means; vertically movable sight gage means connected to the second receiver bottom outlet means by flexible conduit means, said sight gage having a gage outlet exposed to the atmosphere and a liquid outlet adjacent to said gage outlet exposed to the atmosphere.

2. The invention of claim 1 including baffle means located in said second receiver vertically aligned relation with said midsection.

3. The invention of claim 2 wherein said baffle means is of downwardly open frustro conical configuration.

4. The invention of claim 3 wherein said baffle means includes aperture means.

5. A method of separating immiscible first and second liquids, said first immiscible liquid having a specific gravity greater than the specific gravity of said second immiscible liquid, where a reservoir is provided to hold the immiscible liquids and to allow the second liquid to settle to the bottom portion of the reservoir, including supplying a portion of the first and second liquids to a separatory device by a first conduit having a first conduit inlet of first diameter connected to said bottom portion of said reservoir and a first conduit outlet of second diameter greater than said first diameter, where a segment of said conduit between said first conduit inlet and said first conduit outlet has a downward offset; said separatory device having a midsection of selected diameter, and an inlet connected to said first conduit outlet and first and second midsection outlets where a first receiver having a diameter greater than said midsection is disposed above the midsection in communicative relation with the first midsection outlet and a second receiver is disposed beneath the midsection and in communicative relation with the second midsection outlet, where the second receiver has a diameter greater than the diameter than the midsection, and outlet means adjacent the bottom of the second receiver communicating with flexible outlet conduit means and vertically adjustable sight gage means having a gage outlet exposed to the atmosphere and a liquid outlet adjacent to said gage outlet exposed to the atmosphere; filling the second reservoir with said second immiscible fluid to a level within the midsection, adjusting the sight gage to a height above the level of the second liquid in the second receiver, admitting the first and second liquids from the reservoir to the midsection and the first receiver, adjusting the height of the sight gage to a level where said second immiscible liquid flows from the sight gage, and allowing said second immiscible liquid to flow from the sight gage as additional first and second immiscible liquids are received in said midsection.

6. Apparatus for separating first and second immiscible liquids having different specific gravities including a reservoir means to hold said first and second liquids, said reservoir having a reservoir outlet adjacent the lowest part of the reservoir for emission of mixtures of said first and second liquids, a first conduit having a first conduit inlet of first diameter connected to said reservoir outlet, and a first conduit outlet of second diameter greater than said first diameter; vertically disposed elongate separator means having midsection means of selected diameter; midsection inlet means connected to communicate with said first conduit outlet, and midsection first and second openings; first receiver means located above said midsection means having a diameter greater than the diameter of said midsection, first receiver inlet means communicating with said first midsection opening and; closure means over the end of said first receiver opposite said first receiver inlet; a second receiver located beneath said midsection means having a diameter greater than said midsection with said second receiver inlet communicating with said second midsection opening, second receiver bottom outlet means, vertically movable sight gage means connected to the second receiver bottom outlet means by flexible conduit means, said sight gage having a gage outlet exposed to the atmosphere and a liquid outlet adjacent to said gage outlet exposed to the atmosphere; wherein said first conduit is offset downwardly between said reservoir outlet and said first conduit outlet such that phase separation between said first and second liquids can be retained in said first conduit to permit access of both of said first and second liquids to said midsection; and further including baffle means located in said second receiver in vertically aligned relation with said midsection.

* * * * *